United States Patent
Yamada

(10) Patent No.: US 7,941,763 B2
(45) Date of Patent: May 10, 2011

(54) IMAGE PROCESSING APPARATUS OPERATING AS BASED ON HISTORY OF UTILIZED FUNCTION AND METHOD OF CONTROLLING THE SAME

(75) Inventor: Hirokazu Yamada, Kobe (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1331 days.

(21) Appl. No.: 11/224,285

(22) Filed: Sep. 13, 2005

(65) Prior Publication Data

US 2006/0282782 A1 Dec. 14, 2006

(30) Foreign Application Priority Data

Jun. 13, 2005 (JP) .................... 2005-171966

(51) Int. Cl.
*G06F 3/048* (2006.01)
(52) U.S. Cl. .............. 715/825; 715/734; 715/866
(58) Field of Classification Search .......... 709/201–253; 715/825, 734, 866
See application file for complete search history.

(56) References Cited

U.S. PATENT DOCUMENTS

| | | | |
|---|---|---|---|
| 5,517,316 A | 5/1996 | Hube | |
| 5,740,496 A | 4/1998 | Kawabuchi et al. | |
| 6,173,295 B1 | 1/2001 | Goertz et al. | |
| 6,654,140 B1 | 11/2003 | Hirata | |
| 6,865,620 B2 | 3/2005 | Homma | |
| 7,130,069 B1 * | 10/2006 | Homma | 358/1.15 |
| 7,328,245 B1 * | 2/2008 | Hull et al. | 709/206 |
| 7,428,578 B1 * | 9/2008 | Hull et al. | 709/206 |
| 2003/0206312 A1 * | 11/2003 | McAfee et al. | 358/1.15 |
| 2004/0205169 A1 * | 10/2004 | Machida | 709/220 |
| 2005/0018249 A1 * | 1/2005 | Miura et al. | 358/1.15 |
| 2005/0262340 A1 * | 11/2005 | Rabb | 713/165 |

FOREIGN PATENT DOCUMENTS

| | | |
|---|---|---|
| JP | 11-321040 | 11/1999 |
| JP | 2001-306204 | 11/2001 |
| JP | 2003-280789 | 10/2003 |
| JP | 2004-054739 | 2/2004 |
| JP | 2004-140607 | 5/2004 |
| JP | 2004-234195 | 8/2004 |
| JP | 2005-044079 | 2/2005 |
| JP | 2005-094414 | 4/2005 |
| JP | 2005-123866 | 5/2005 |

OTHER PUBLICATIONS

Japanese Official Notice of Grounds of Rejection dated Feb. 13, 2007 (with English Translation).

* cited by examiner

*Primary Examiner* — Boris Pesin
*Assistant Examiner* — Omar Abdul-Ali
(74) *Attorney, Agent, or Firm* — Buchanan Ingersoll & Rooney PC

(57) ABSTRACT

An image processing apparatus is connected on a network to another image processing apparatus and has an operation portion displayed at a display portion for implementing a function setting of a combination corresponding to a condition when a history of a function utilized in the other image processing apparatus by a user authenticated by a user authentication portion satisfies that condition.

19 Claims, 14 Drawing Sheets

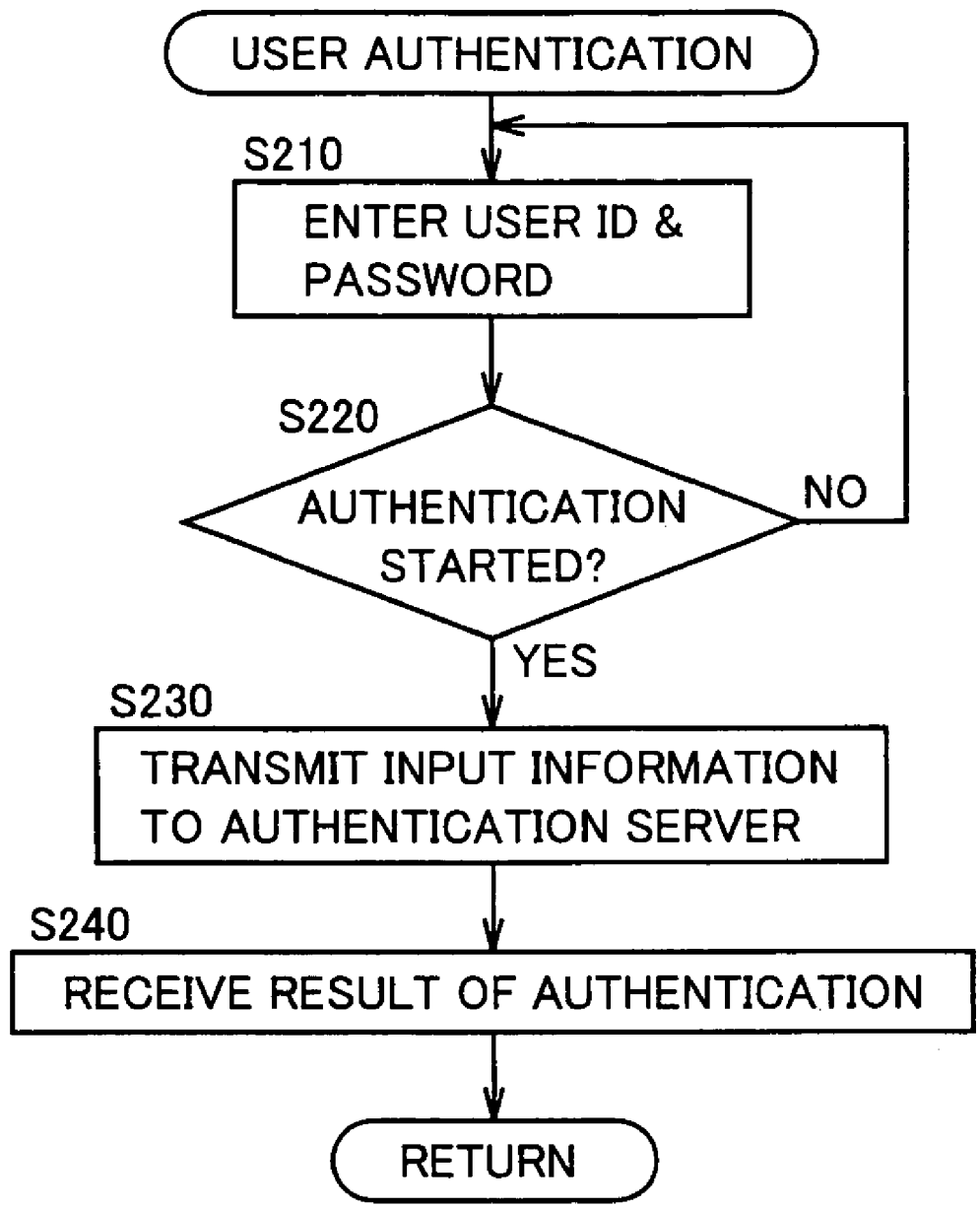

IMAGE PROCESSING APPARATUS OPERATING AS BASED ON HISTORY OF UTILIZED FUNCTION AND METHOD OF CONTROLLING THE SAME

This application is based on Japanese Patent Application No. 2005-171966 filed with the Japan Patent Office on Jun. 13, 2005, the entire content of which is hereby incorporated by reference.

BACKGROUND OF THE INVENTION

1. Field of the Invention

The present invention relates generally to image processing apparatuses and particularly to image processing apparatuses capable of obtaining a history of a function utilized by a user and methods thereof.

2. Description of the Related Art

Conventionally there has been disclosed a variety of techniques enhancing convenience in image processing apparatuses operating in accordance with the user's operations to input and output images.

For example Japanese Laid-Open Patent Publication No. 2004-234195 discloses that when an image formation apparatus starts to copy, the apparatus counts up frequency-of-use count data corresponding to a combination of a function setting associated with the current image density, scaling, sheet size, double-sided mode setting, or margin shift, frame erasing or similar image processing mode, and when the frequency of use attains a prescribed level the function setting's combination is registered as a program.

Furthermore, Japanese Laid-Open Patent Publication No. 2004-140607 discloses that in a communication system composed of a plurality of terminals connected on a local area network (LAN) a setting associated with one-touch dial for each individual is registered with a server and by logging in the system the registered one-touch dial can be used at any device in the system.

Furthermore, Japanese Laid-Open Patent Publication No. 2004-054739 discloses that in a network system when a device in the system has an additional function introduced therein a first server automatically can detect it and a functional component of a program required to use the function can be downloaded from a second server and installed in the system at a component as required to set an environment allowing the function to be usable.

Thus conventionally a variety of techniques are disclosed that allow a user to more conveniently use in an existing device a function that has been used in the device, allow information employed in using a function in a network to be shared to allow the information to be exactly utilized in the network by any device to provide enhanced convenience, and/or allow a setting to be automatically done for allowing a user to utilize a new function.

However, a technique presenting a function surpassing a function recognized by a user, i.e., a technique presenting to the user a function preceding one step ahead, has not conventionally been disclosed, and such technique is constantly demanded so that the user can use a device conveniently.

SUMMARY OF THE INVENTION

The present invention has been made to address such circumstance and it contemplates an image processing apparatus capable of foreseeing and presenting to a user a function that the user desires in the image processing apparatus, and a method of controlling the same.

The present invention in one aspect provides an image processing apparatus connected on a network to another image processing apparatus, including: a display portion displaying information; a user authentication portion authenticating a user; a history information acquisition portion acquiring a history of a function utilized in the other information processing apparatus by the user authenticated by the user authentication portion; a determination portion determining whether the history obtained by the history information acquisition portion satisfies a prescribed conditions; and a display control portion causing the display portion to display an operation portion for implementing a function setting of a combination corresponding to the prescribed condition when the determination portion determines that the prescribed condition is satisfied.

The present invention in another aspect provides an image processing apparatus connected on a network to another image processing apparatus, including: a display portion displaying information; a user authentication portion authenticating a user; a history information acquisition portion acquiring a history of a function utilized in the other information processing apparatus by the user authenticated by the user authentication portion; a function information acquisition portion acquiring information of a function mounted in the other information processing apparatus; and a display control portion causing the display portion to display an operation portion for implementing a prescribed function setting, wherein the display control portion determines the prescribed function setting in type from information acquired by the history information acquisition portion and the function information acquisition portion.

The present invention provides a method of controlling an image processing apparatus connected on a network to another image processing apparatus, including the steps of: authenticating a user; acquiring a history of a function utilized by the user at the other image processing apparatus; determining whether the history satisfies a prescribed condition; and displaying an operation portion for implementing a function setting of a combination corresponding to the prescribed condition when a decision is made that the history satisfies the prescribed condition.

In accordance with the present invention in one aspect an operation portion can be displayed for implementing a function setting corresponding to a history of a function utilized in the image processing apparatus. A function that would be desired by a user can be foreseen from a function utilized by the user in another image processing apparatus and the foreseen function can be presented to the user in the form of displaying the operation portion.

In accordance with the present invention in another aspect an image processing apparatus for which a user is authenticated displays an operation portion as based on a history of a function utilized by the user in another image processing apparatus.

Thus an image processing apparatus currently used by a user displays an operation portion for implementing a function setting of those which the image processing apparatus can provide that is determined by a history of a function having been utilized by the user in another image processing apparatus. Thus a function that would be desired by the user can be selected from functions that the image processing apparatus used by the user can provide, and the selected function can be presented to the user in the form of displaying the operation portion.

The foregoing and other objects, features, aspects and advantages of the present invention will become more appar-

BRIEF DESCRIPTION OF THE DRAWINGS

FIG. 6 is a flow chart of a subroutine of a user authentication process indicated in FIG. 4.

FIGS. 15 and 16 show one example of displaying on a display panel that the FIG. 3 console is equipped with.

DESCRIPTION OF THE PREFERRED EMBODIMENTS

Figure 1:
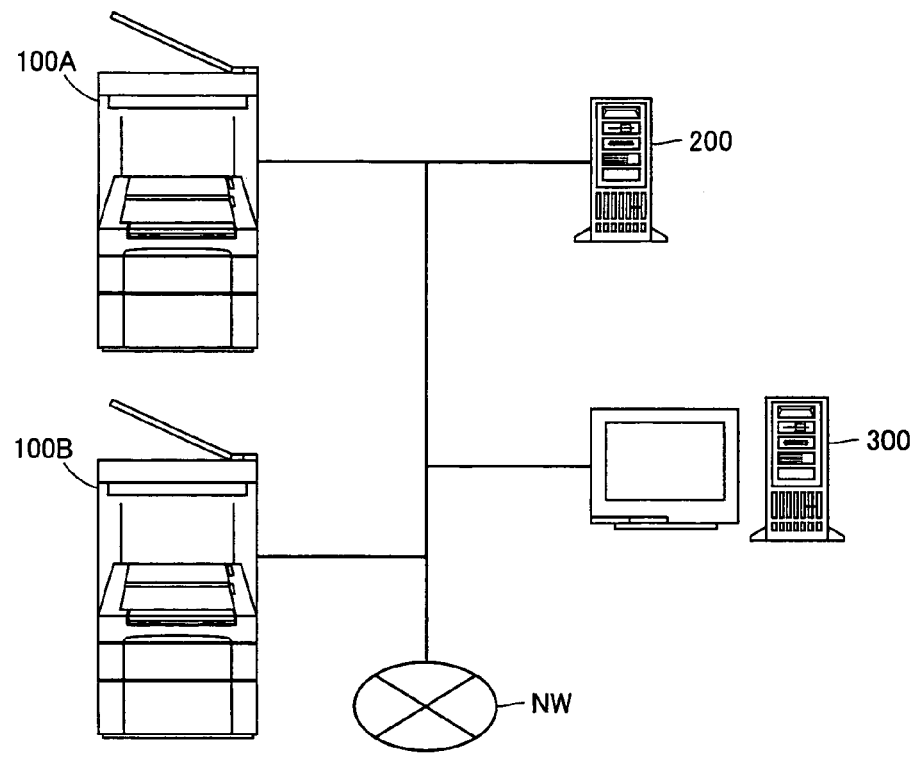
FIG. 1 shows a configuration of an image processing system including an MFP corresponding to the present image processing apparatus in one embodiment.

FIG. 1 shows a configuration of an image processing system including multifunction peripherals (MFP) corresponding to the present image processing apparatus in one embodiment.

With reference to the figure, the image processing system includes networked MFPs 100A, 100B, a similarly networked server 200, and a similarly networked personal computer (PC) 300. The network is connected to an internet NW, and MFPs 100A, 100B, server 200, and PC 300 can access external equipment via internet NW. Furthermore, MFP 100A, 100B is connectable to a line of a public switched telephone network (PSTN) or the like for facsimile transmission and the like. Note that the number of networked MFPs is not limited to that indicated in FIG. 1.

PC 300 has a configuration that a typical information terminal capable of communication has.

Figure 2:
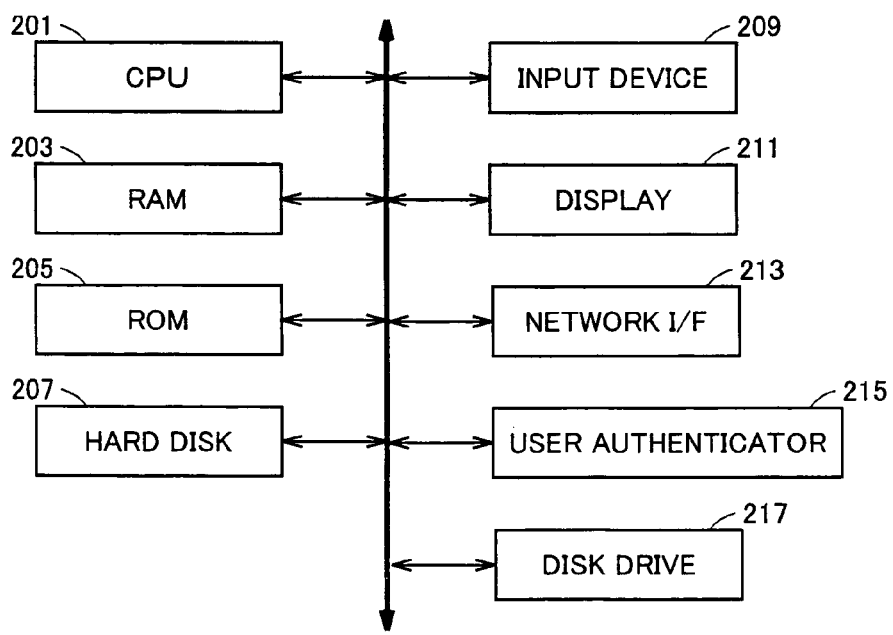
FIG. 2 is a block diagram showing a hardware configuration of a server shown in FIG. 1.

FIG. 2 shows a hardware configuration of server 200 shown in FIG. 1.

With reference to the figure, server 200 includes a central processing unit (CPU) 201 generally controlling server 200, a random access memory (RAM) 203 temporarily storing data, a read only memory (ROM) 205 storing a program, a constant and the like, a hard disk 207 rewritably storing a program, a constant and the like, an input device 209 receiving information input by a user, a display unit 211 displaying information, network interface (I/F) 213 employed to connect to a network, a PSTN and/or the like, a user authenticator 205 associating each user's user ID with a password and thus storing them and also authenticating each user, and a medium drive 217 reading and writing information from and to a flexible disk, a compact disk read only memory (CD-ROM) and the like serving as a storage medium detachably attachable to server 200.

Figure 3A:
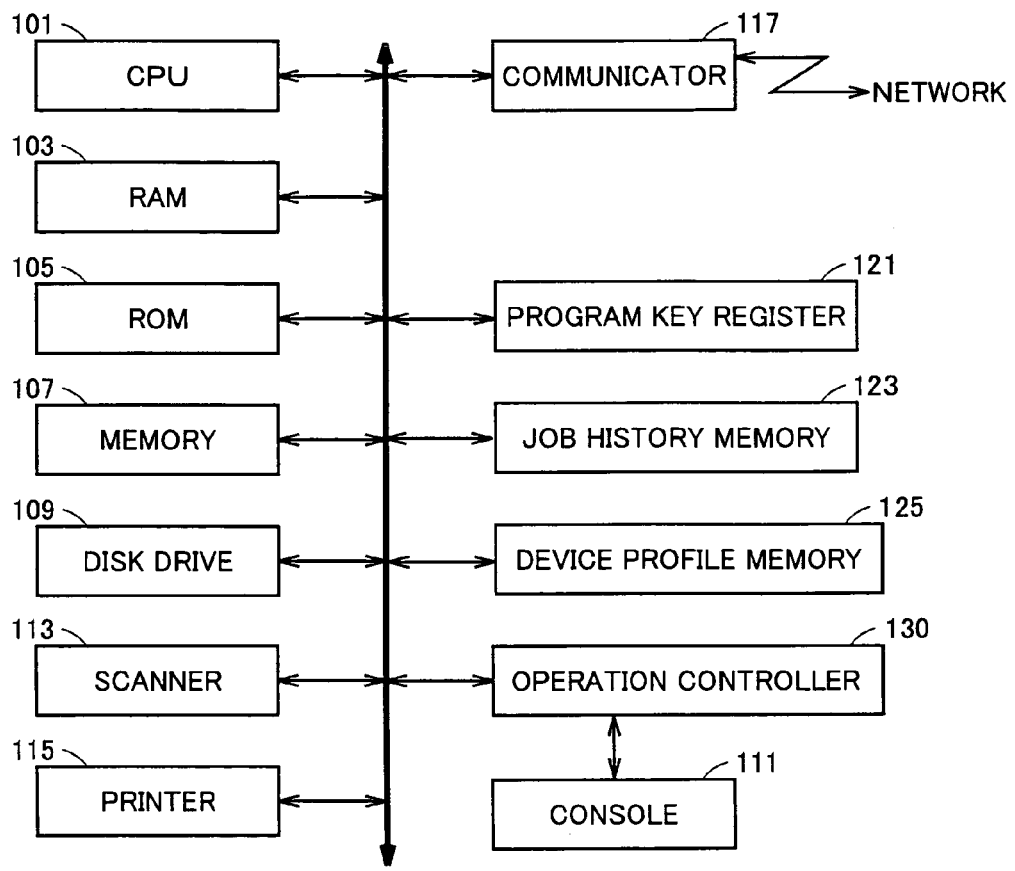
FIG. 3A shows a hardware configuration of the FIG. 1 MFP, and FIG. 3B more specifically shows a configuration of an operation controller shown in FIG. 3A.

FIG. 3A shows a hardware configuration of MFP 100A shown in FIG. 1.

With reference to the figure, MFP 100A includes a CPU 101 generally controlling MFP 100, a RAM 103 temporarily storing data, a ROM 105 storing a program, a constant and the like, a memory 107 for example storing data of a job registered with MFP 100A, a medium driver 109 reading and writing information from and to a flexible disk, a CD-ROM and the like serving as a storage medium detachably attachable to MFP 100A, a console 111, a scanner 113 reading an image of an original to generate image data, a printer 115 printing the image data on a sheet, and a communicator 117 operating to connect to a network, a PSTN, and the like.

Console 111 includes a display screen (a display panel 508 described later) displaying a state of MFP 100A, an option of a command, and the like to a user, and a key pressed by a user to input information. Note that the display screen and the key may be implemented by a liquid crystal display and a touch panel mounted thereon.

MFP 100A further includes a program key register 121 specifically storing a key displayed on console 111, a job history memory 123 specifically storing a setting associated with a job executed in MFP 100A, a device profile memory 125 storing information on a device that MFP 100A is equipped with, and an operation controller 130 specifically controlling the key displayed on console panel 111.

Program key register 121 specifically stores a key for each user that is displayed on console panel 111. More specifically, program key register 121 stores as program key information a specific setting associated with an operation of an MFP and a name for the setting such that the setting and the name are associated with each other. An MFP can display a program key on a display panel (display panel 508 described later) with a preset number set as an upper limit. A program key is a key based on a name of a specific setting in the program key information as described above and can be operated to readily set in an MFP the specific setting corresponding to the name.

Figure 3B:
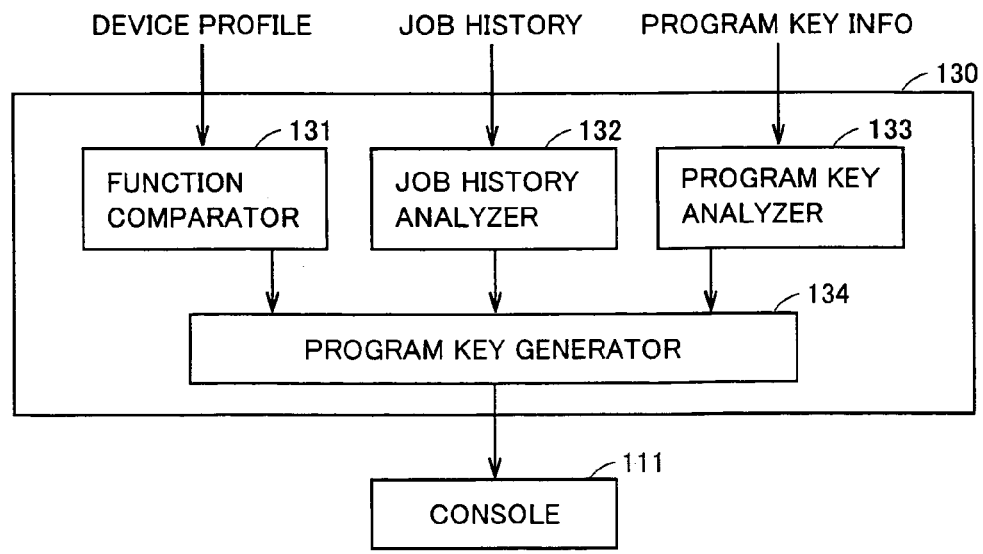

FIG. 3B specifically shows a configuration of operation controller 130.

Operation controller 130 includes a function comparator 131 specifically comparing memory stored in its MFP's device profile memory 125 and that stored in a different MFP (in the present embodiment, MFP 100B)'s device profile memory 125, a job history analyzer 132 analyzing from memory stored in the different MFP's job history memory 123 a function used in the different MFP, and a program key analyzer 133 analyzing program key information displayed on the different MFP's console 111.

In the present embodiment MFP 100B for the sake of illustration has a configuration similar to MFP 100A described with reference to FIGS. 3A and 3B.

In the present embodiment when a user frequently utilizing MFP 100A utilizes MFP 100B, a process is effected in MFP 100B so that the user can use it more conveniently. Note that in the following description MFP 100A will be referred to as a "home MFP" in the sense that it is frequently used by a user, whereas MFP 100B will be referred to as an "away MFP".

Table 1 indicates one example of a job history stored in the home MFP (MFP 100) at job history memory 123.

TABLE 1

| History No. | User Name | Date | Time | Application | Mode | Document Name | Destination | Format | Other Mode Information |
|---|---|---|---|---|---|---|---|---|---|
| 100 | yamada | Mar. 31, 2005 | 9:12 | Box Transmission | E-mail | Notification of Holding Conference.doc | tanaka | TIFF | |
| 101 | yamada | Mar. 31, 2005 | 9:13 | Box Transmission | FAX | Notification of Holding Conference.doc | suzuki | . . . | |
| 102 | yamada | Mar. 31, 2005 | 9:15 | Box Transmission | PC | Notification of Holding Conference.doc | sato | PDF | Resolution: 200 dpi |
| 103 | yamada | Mar. 31, 2005 | 9:16 | Box Transmission | E-mail | Notification of Holding Conference.doc | kinoshita | PDF | Resolution: 200 dpi |
| 104 | kagawa | Mar. 31, 2005 | 9:20 | Copy | Double-sided | | . . . | . . . | |
| 105 | akita | Mar. 31, 2005 | 9:40 | Copy | Single-sided | | | | |
| 106 | miyamoto | Mar. 31, 2005 | 10:00 | Print | Single-sided | Specification.doc | . . . | . . . | |
| 107 | matsubara | Mar. 31, 2005 | 10:30 | Print | Double-Sided | Graph.xls | | | |
| 108 | ozawa | Mar. 31, 2005 | 11:30 | Copy | Single-sided | | | | |
| 109 | yamada | Mar. 31, 2005 | 11:35 | Scan | E-mail | | yamada | PDF | Resolution: 200 dpi |
| 110 | nakata | Mar. 31, 2005 | 11:41 | Print | Single-sided | | | | |
| 111 | kimura | Mar. 31, 2005 | 11:45 | Scan | PC | | kimura | PDF | Resolution: 600 dpi |
| 112 | yamada | Mar. 31, 2005 | 11:50 | Print | Single-sided | Quote.txt | | | |
| 113 | yamada | Mar. 31, 2005 | 11:52 | Box Storage | | Quote.txt | Shared BOX | PDF | Resolution: 200 dpi |
| 114 | takahashi | Mar. 31, 2005 | 11:59 | Copy | Single-sided | | | | |
| 115 | kagawa | Mar. 31, 2005 | 13:05 | Print | Double-sided | Information.doc | | | |
| 116 | yamada | Mar. 31, 2005 | 13:15 | Print | Single-sided | Request.doc | | | |
| 117 | yamada | Mar. 31, 2005 | 14:30 | Scan | E-mail | | yamada | PDF | Resolution: 200 dpi |
| 118 | akita | Mar. 31, 2005 | 14:49 | Copy | Double-sided | | | | |
| 119 | fujimoto | Mar. 31, 2005 | 15:03 | Print | Single-sided | Report.xls | | | |
| 120 | hirota | Mar. 31, 2005 | 15:28 | Scan | PC | | mimura | JPEG | Resolution: 600 dpi |
| 121 | kobayashi | Mar. 31, 2005 | 16:05 | Scan | E-mail | | kobayashi | PDF | Resolution: 600 dpi |
| 122 | kato | Mar. 31, 2005 | 16:44 | Scan | E-mail | | kato | PDF | Resolution: 600 dpi |
| 123 | yamada | Mar. 31, 2005 | 16:58 | Scan | E-mail | | yamada | PDF | Resolution: 200 dpi |
| 124 | yamada | Mar. 31, 2005 | 17:05 | Print | Single-sided | Quote 2.txt | | | |
| 125 | yamada | Mar. 31, 2005 | 17:08 | Box Storage | | Quote 2.txt | Shared BOX | PDF | Resolution: 200 dpi |

The job history is a history of a job executed in the home MFP. More specifically, as can be seen in Table 1, the job history includes a history number indicating a serial number of a job executed in the home MFP, a user name indicating a user having input the job, a date and time on and at which the job is executed, an application indicating a name of an application utilized to execute the job, a mode applied to execute the job, a document name indicating a name of a document subjected to the job, a destination indicating a name of a user corresponding to a destination for transmission of the job, a format employed in the job to generate a file, and other mode information including specific setting information in the job.

MFPs 100A and 100B can utilize scanner 113, printer 115 and other similar devices to copy, print, scan, and provide Box storage and Box transmission, and in the job history the "application" column stores any of these operations.

Furthermore, MFPs 100A and 100B are capable of setting a variety of modes for each operation (or application).

For example, "copy" can be done in a mode including "double sided" and "single sided" associated with whether to provide an output on opposite sides or one side of a sheet.

Furthermore, "print" can be done in a mode including "double sided" and "single sided" associated with whether data received through a network from PC 300 should be output on opposite sides or one side of a sheet.

Furthermore, "scan" can be done in a mode including "PC" and "E-mail" associated with whether a file generated by scanner 113 should be transmitted on a network to PC 300 or on internet NW as e-mail. Furthermore, for scanning, the resolution of the file generated by scanner 113 is stored as other mode information.

Furthermore, "BOX transmission" is done in a mode including "PC" and "E-mail" and in addition thereto "FAX" indicating transmission via facsimile.

Note that for "BOX storage", a generated file is stored in MFP 100A or 100B and accordingly mode information is not stored, and as a destination, information specifying a location (such as a folder or the like) having the generated file stored therein is stored.

Table 2 indicates one example of a device profile stored in the home MFP (MFP 100A) at device profile memory 125.

TABLE 2

| Classification | Function Name | Function Code | Mounted/ Unmounted |
|---|---|---|---|
| Copy | OHP Slip Sheet | 1001 | Y |
| Copy | Electronic Sort | 1002 | Y |
| Copy | Booklet | 1003 | Y |
| Copy | Mixed Originals | 1004 | Y |
| Copy | : | 1005 | : |
| Copy | : | 1006 | : |
| | : | | |
| Scan/ Box Transmission | PDF Conversion | 2001 | Y |
| Scan/ Box Transmission | Compact PDF Conversion | 2002 | N |
| Scan/ Box Transmission | Broadcasting | 2003 | N |
| Scan/ Box Transmission | Scan to SMB | 2004 | N |
| Scan/ Box Transmission | Scan to FTP | 2005 | N |
| | : | | : |
| | : | | |
| Fax | Aggregate Transmission | 4001 | Y |
| Fax | Polling | 4002 | Y |
| Fax | Timer Transmission | 4003 | Y |
| Fax | Box Designation Transmission | 4004 | N |
| Fax | : | 4005 | |
| | : | | |
| Print | Print & Box Storage | 5001 | N |
| Print | Confidential Print | 5002 | Y |

Furthermore Table 3 indicates one example of a device profile stored in the away MFP (MFP 100B) at device profile memory 125.

TABLE 3

| Classification | Function Name | Function Code | Mounted/ Unmounted |
|---|---|---|---|
| Copy | OHP Slip Sheet | 1001 | Y |
| Copy | Electronic Sort | 1002 | Y |
| Copy | Booklet | 1003 | Y |
| Copy | Mixed Originals | 1004 | Y |
| Copy | : | 1005 | : |
| Copy | : | 1006 | : |
| Scan/ Box Transmission | PDF Conversion | 2001 | Y |
| Scan/ Box Transmission | Compact PDF Conversion | 2002 | Y |
| Scan/ Box Transmission | Broadcasting | 2003 | Y |
| Scan/ Box Transmission | Scan to SMB | 2004 | Y |
| Scan/ Box Transmission | Scan to FTP | 2005 | Y |
|  | : |  | : |
| Fax | Aggregate Transmission | 4001 | Y |
| Fax | Polling | 4002 | Y |
| Fax | Timer Transmission | 4003 | Y |
| Fax | Box Designation Transmission | 4004 | Y |
| Fax | : | 4005 | : |
| Print | Print & Box Storage | 5001 | Y |
| Print | Confidential Print | 5002 | Y |

With reference to Tables 2 and 3, a device profile stores a classification indicating a type of application in an MFP, a function name indicating a function associated with an application and a function code indicating a code specifying a function, and whether each MFP mounts function or not is indicated by Y or N. The function name and code are common between MFPs.

For example, for copy, "OHP slip sheet" (a function associated with copying on a film to insert a sheet of paper between over head projector (OHP) film), "electronic sort" (a function sorting sheets output), "booklet" (a function copying a plurality of originals to provide a double sided copy for saddle stitch binding (or being folded at the center), and "mixed originals" (a function allowing a mixture of originals different in size and set in an automatic sheet feeder to each be detected in size and copied on an appropriate sheet) are indicated by way of example and assigned function codes "1001", "1002", "1003" and "1004", respectively. These functions are mounted in both the home and away MFPs.

Furthermore, for scan/box transmission, "PDF conversion (a function converting to a portable document format (PDF) file a file generated by reading an image by scanner 113), "compact PDF conversion" (a function compressing a file generated by reading an image by scanner 113, in an optimal system depending on the type of an image included therein for conversion to a PDF file allowing a more compact file size), "broadcasting" (a function transmitting a single document to different destinations at a time), and "scan to SMB" (a function transmitting to a shared folder in PC 300 a file generated by reading an image by scanner 113) are indicated by way of example and assigned function codes "2001", "2002", "2003" and "2004", respectively. Of these functions, "PDF conversion" is mounted in the home and away MFPs, whereas "compact PDF conversion", "broadcasting" and "scan to SMB" are mounted only in the away MFP.

Figure 4:
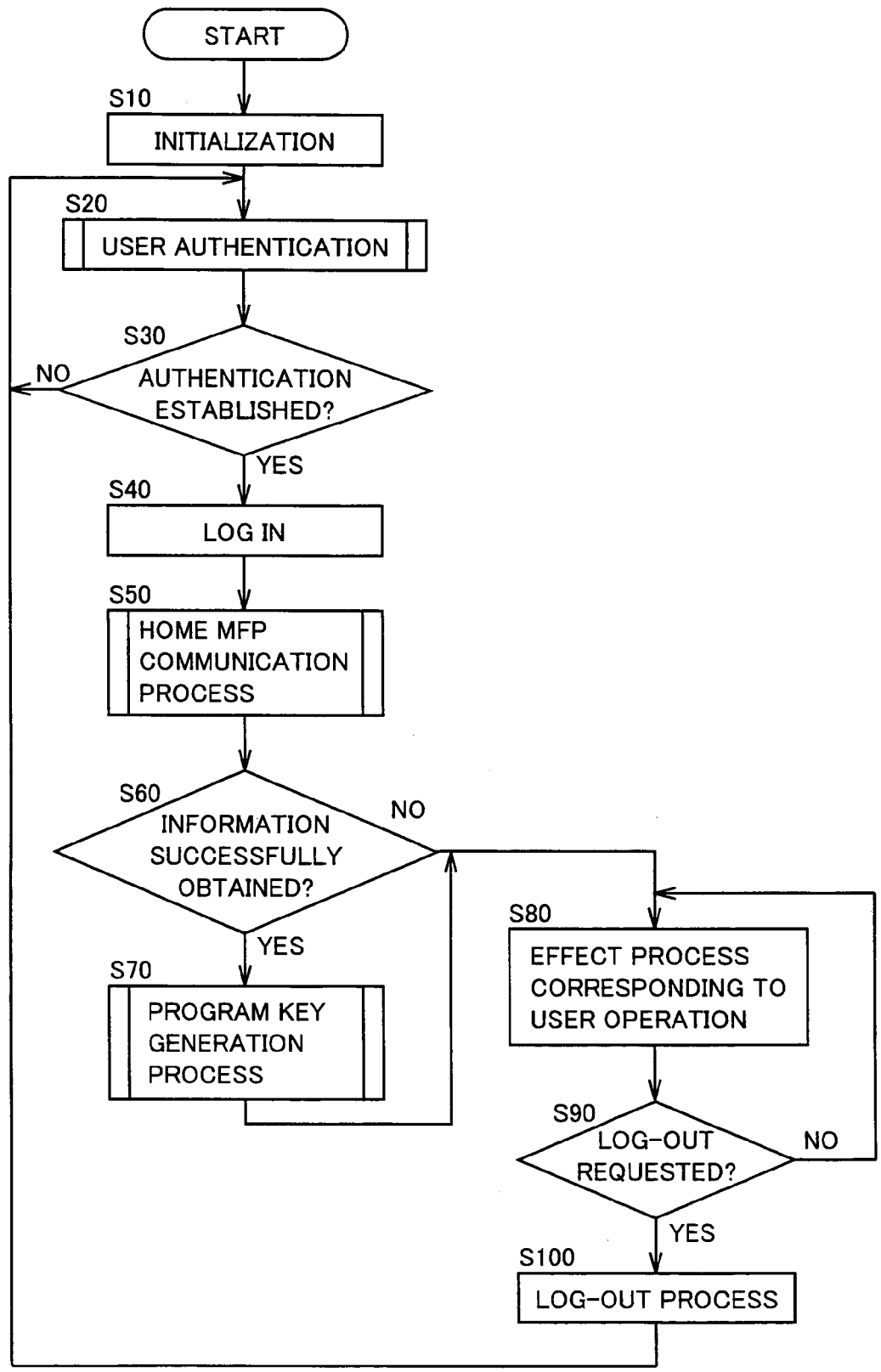
FIG. 4 is a flow chart of main routine of a CPU of the FIG. 1 MFP.

MFP 100B generally operates as described hereinafter. FIG. 4 is a flow chart of a main routine of CPU 101 of MFP 100B.

With reference the figure, when MFP 100B is powered on, CPU 101 goes to step S10 to perform initialization. This causes the console 111 display panel 508 to display an indication as shown in FIG. 5A.

Figure 5A:
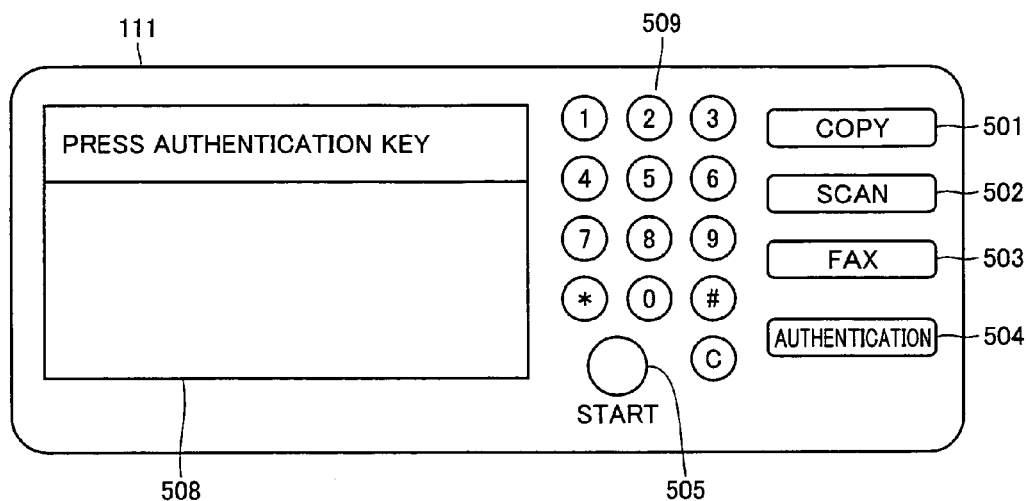
FIG. 5A shows a console in initialization.

With reference to FIG. 5A, console 111 includes a start key 505 pressed to enter an instruction to start a copy or similar operation, a numeral key 509 pressed for example to input the number of copies, a copy key 501 pressed to start an application for copy, a scan key 502 pressed to start an application for scan, a fax key 503 pressed to start an application for fax, an authentication key 504 pressed for user authentication, and display panel 508.

Display panel 508 is a liquid crystal panel having a surface with a touch panel stacked thereon, and receives an input from a user touching the panel and also displays a message indicating the number of copies and the MFP's state. Furthermore, in FIG. 5A, "press authentication key" is indicated as a message.

In response to this indication authentication key 504 is pressed, and in response the process proceeds with step S20.

Figure 5B:
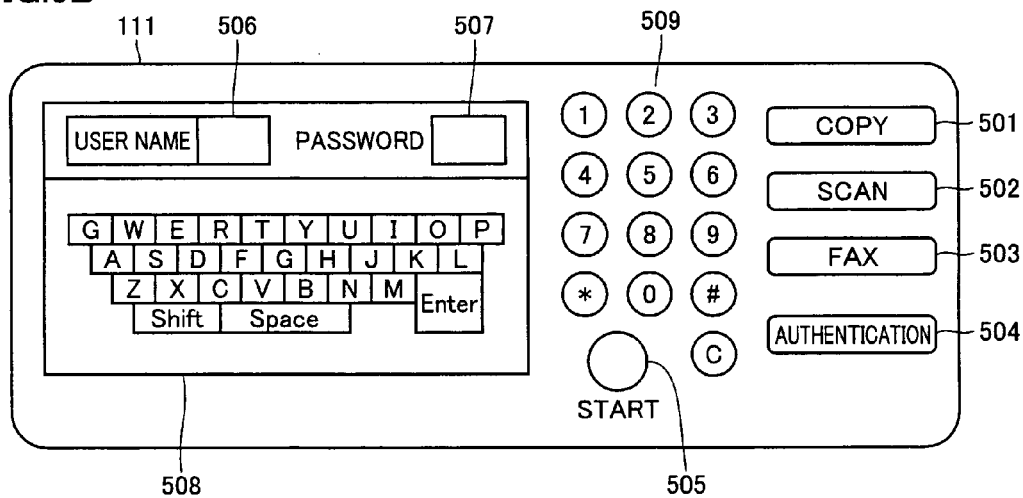
FIG. 5B shows the console with an authentication key operated.

Note that when authentication key 504 is pressed, display panel 508 is switched to display an indication as shown in FIG. 5B.

With reference to FIG. 5B, display panel 508 displays a box 506 for entering a user name, and a box 507 for entering a password. Furthermore, display panel 508 displays a keyboard employed to enter the user name. Based on such indication, a user inputs a user name and a password in boxes 506 and 507.

At step S20 CPU 101 effects a user authentication process as will now be more specifically described hereinafter with reference to a subroutine shown in FIG. 6.

With reference to the figure, the user authentication process is performed as follows: CPU 101 initially goes to step S210 to read the user name (or user ID) and password entered in boxes 506 and 507, and if at step S220 a decision is made that an instruction is issued to start authentication, CPU 101 proceeds with step S230. CPU 101 makes such decision for example when authentication key 504 is pressed.

At step S230 CPU 101 transmits to server 200 the user name and password entered in boxes 506 and 607 and at step S240 receives a reply from server 200 as to whether the user authentication is established, and returns the process.

Note that when server 200 receives the user name and password, server 200 references a user name and password stored in user authenticator 215 to determine whether the received password corresponds to the received user name. If so, server 200 transmits to an MFP a reply indicating that the authentication is established. Otherwise server 200 transmits to the MFP a reply indicating that the authentication fails.

With reference again to FIG. 4, at step S30 CPU 101 specifically determines the reply received from serve 200. More specifically, if the reply indicates that the authentication is established, CPU 101 goes to step S40, otherwise CPU 101 returns to step S20.

At step S40 CPU 101 effects a log in process. Thus a user having his/her user name input in box 56 becomes a logged in user.

Figure 7:
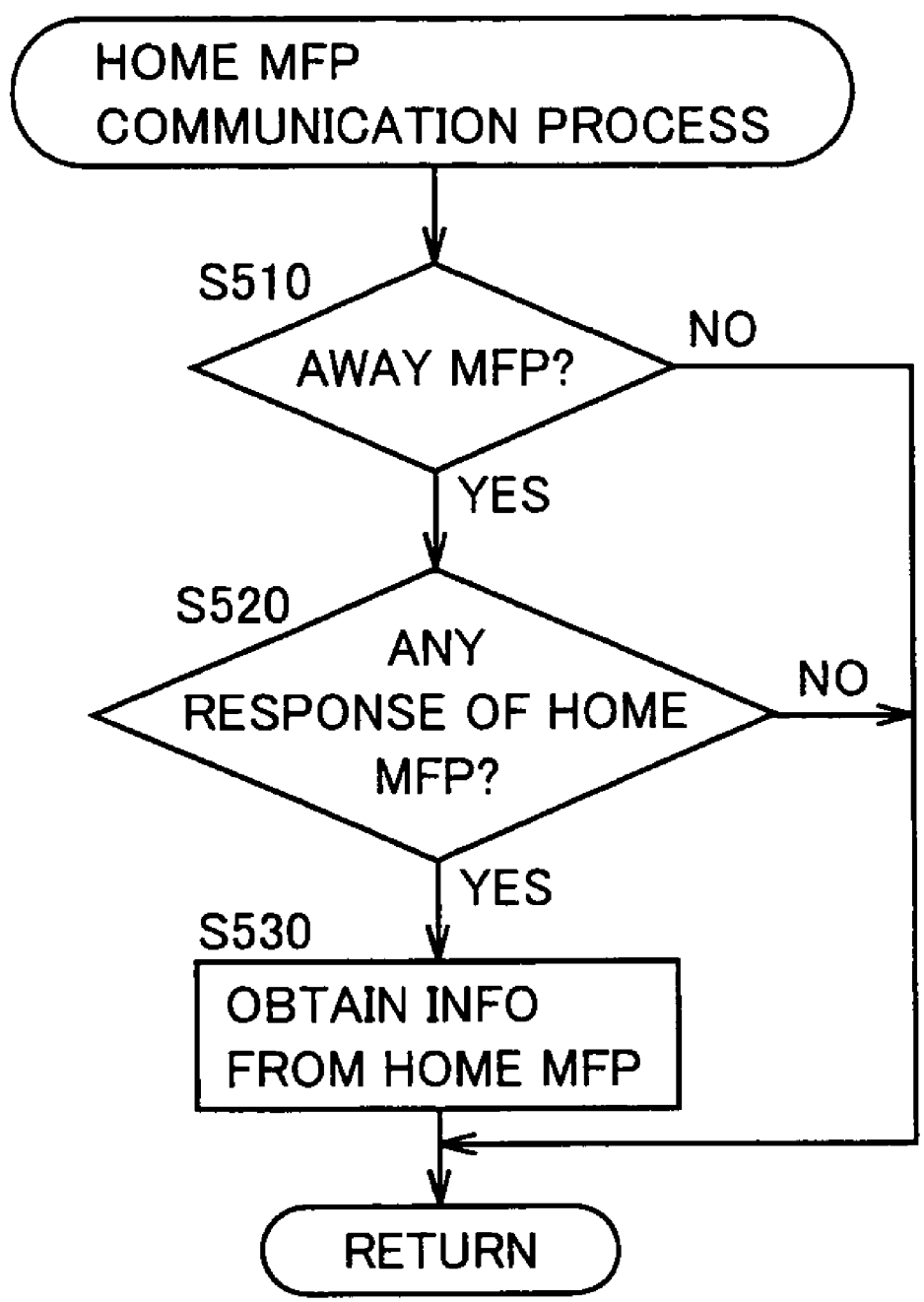
FIG. 7 is a flow chart of a subroutine of a home MFP communication process indicated in FIG. 4.

Then CPU 101 goes to step S50 to effect a home MFP communication process, as will be described hereinafter with reference to a subroutine shown in FIG. 7.

With reference to the figure, the home MFP communication process is performed as follows: CPU 101 initially goes to step S510 to determine whether an MFP which a user currently logs in is an away MFP for the user. Note that information indicating which MFP on a network is a home MFP and which MFP on the network is an away MFP for each user, is stored in server 200. CPU 101 for example receives such information in the user authentication process from server 200, and if CPU 101 determines that its MFP is an away MFP CPU 101 goes to step S520 and if CPU 101 determines that its MFP is a home MFP then CPU 101 returns the process. For example, if a user for whom MFP 100A is a home MFP logs in MFP 100B, MFP 100B determines that MFP 100B is an away MFP for the logged in user.

At step S520 CPU 101 requests a home MFP in an image processing system to transmit a job history and device profile of interest and also determines whether there is a reply. If so, then CPU 101 goes to S530, otherwise returns the process.

At step S530 CPU 101 receives (or obtains) from the home MFP the program key information, job history and device profile associated with the logged in user and returns the process. The received program key information associated with the logged in user is stored to program key register 121.

With reference again to FIG. 4, at step S60 CPU 101 determines whether information is obtained at step S50 from the home MFP (step S530) successfully, and if so, CPU 101 proceeds with step S70, otherwise CPU 101 proceeds with step S80. Note that if its MFP is a home MFP, CPU 101 also goes to step S80.

At step S80 CPU 101 effects a process corresponding to the user's operation and goes to step S90.

At step S90 CPU 101 determines whether the logged in user operates console 111, as appropriate, to issue a request to log out. If CPU 101 determines that such request is not made, CPU 101 returns to step S80. In contrast, if CPU 101 determines that such request has been made, CPU 101 goes to step S100 to perform a process for logging out and returns to step S20 and waits a different user to issue a request to log in.

In contrast, at step S70 CPU 101 performs a program generation process and thereafter goes to step S80. The program generation process will now be described more specifically with reference to FIGS. 8 and 9 showing a subroutine's flow chart.

Figure 8:
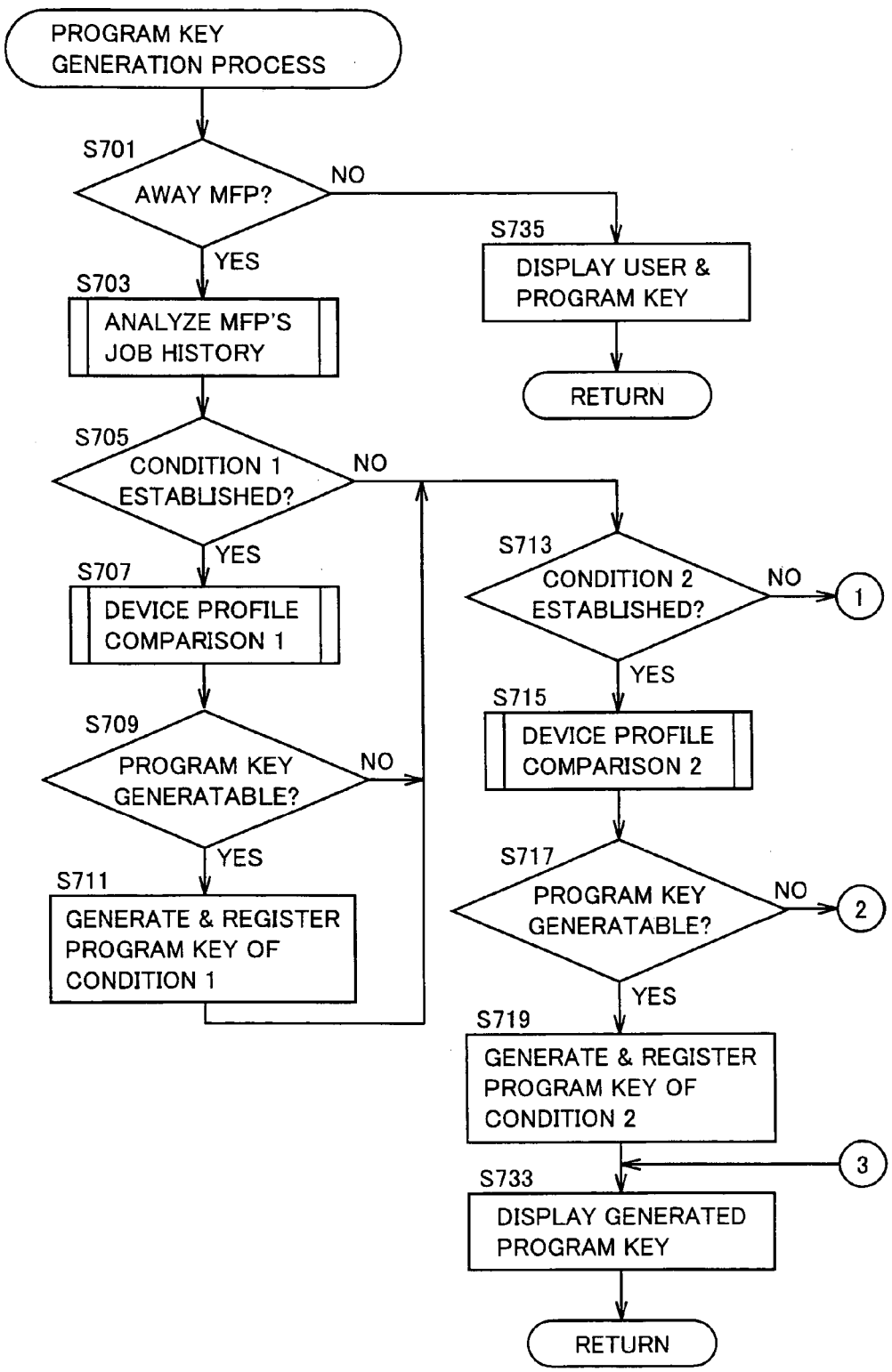
FIGS. 8 and 9 are a flow chart of a subroutine of a program generation process indicated in FIG. 4.
Figure 9:
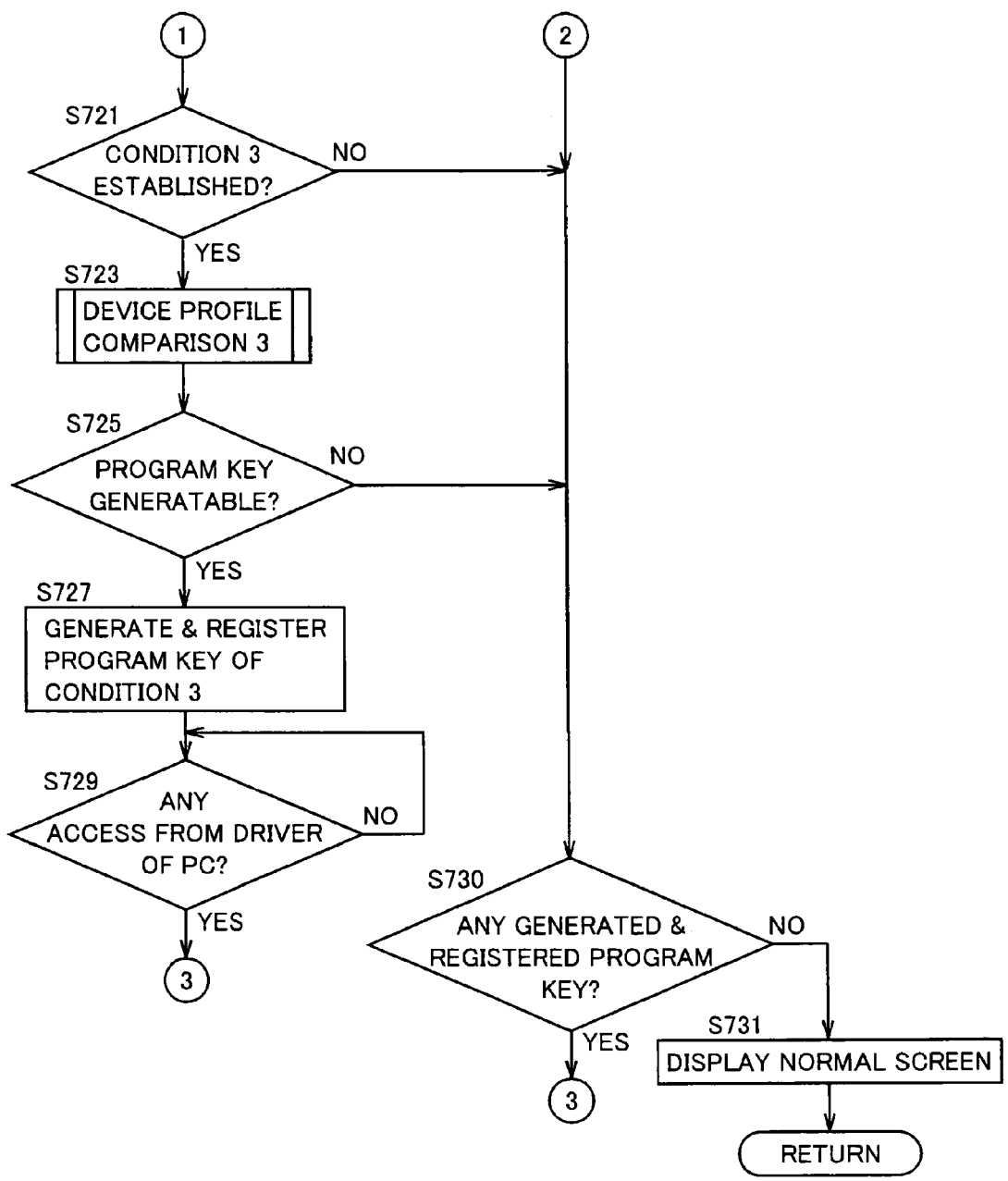

With reference to FIG. 8, the program generation process is effected as follows: initially at step S701 CPU 101 determines whether its MFP is an away MFP and if so CPU 101 goes to step S703, otherwise CPU 101 goes to step S735.

At step S735 CPU 101 causes display panel 508 to display a user and program key associated with a logged in user and thus previously registered and returns the process.

Figure 10:
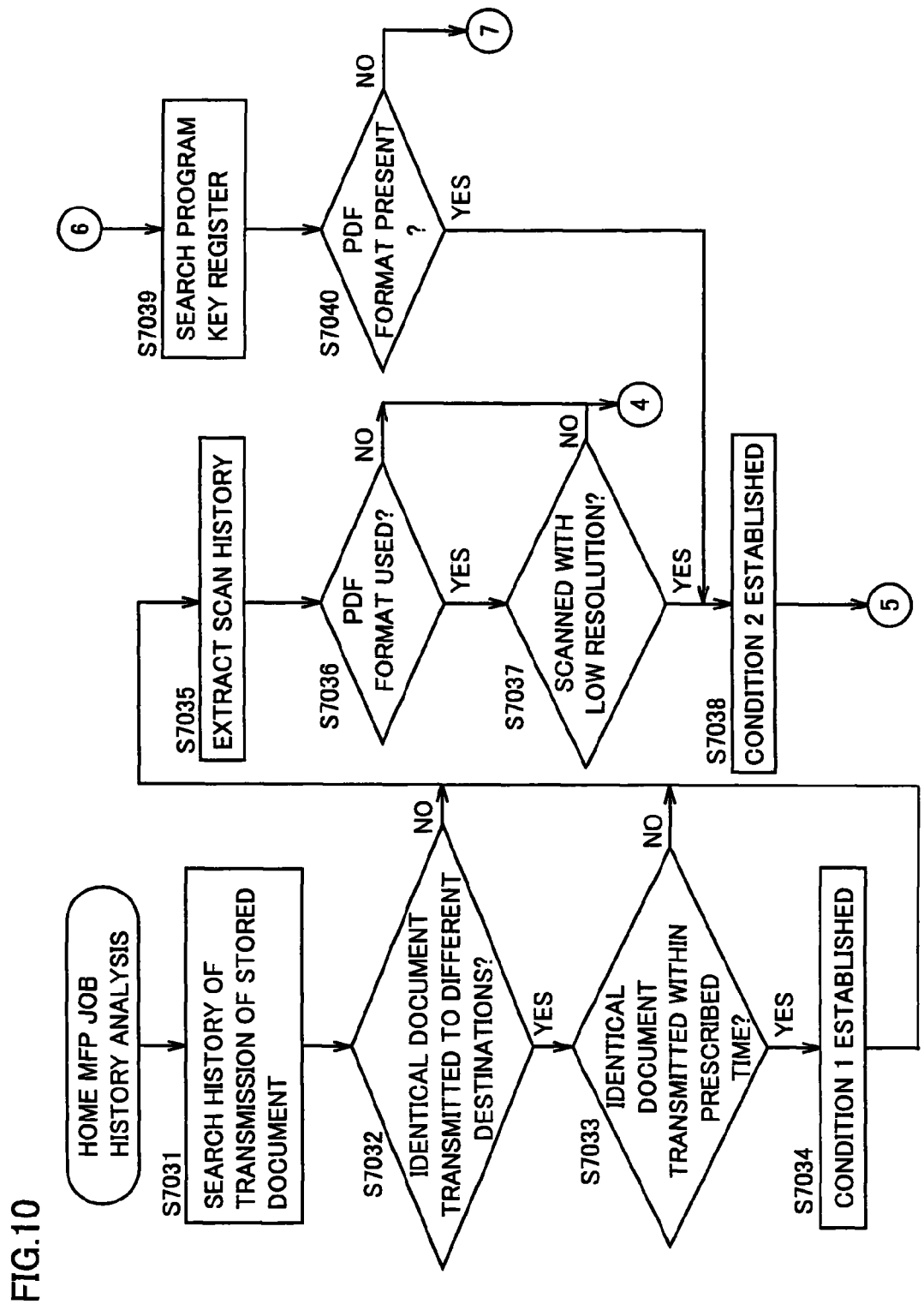
FIGS. 10 and 11 are a flow chart of a subroutine of a home MFP job history analysis process indicated in FIG. 8.

In contrast, at step S703 CPU 101 drives job history analyzer 132, as appropriate, to analyze the home MFP's job history obtained at step S530 (see FIG. 7), as will now be described hereinafter with reference to FIGS. 10 and 11 indicating a subroutine's flow chart.

In the home MFP job history analysis process CPU 101 initially at step S7031 extracts any jobs in the home MFP's job history with a user box indicating the currently logged in user's user name, and the extract jobs are searched through for a history of transmitting a stored document.

Then at step S7032 CPU 101 determines from a result of searching at step S7031 whether the logged in user transmits a single document (an identically named document) to a plurality of different destinations. If so, CPU 101 goes to step S7033, otherwise to step S7035.

Note that whether a transmitted document is an identical document or not can be determined not only by the document's name but also comparing the document's image or comparing code information embedded in an original.

At step S7033 CPU 101 determines whether the transmission of the single document to the plurality of destinations, as determined at step S7032, is done within a prescribed period of time. If so CPU 101 goes to step S7034 to provide a setting (e.g., set a flag) indicating that a condition 1 is established, and thereafter goes to step S7035. Otherwise, CPU 101 goes to step S7035.

At step S7035 CPU 101 extracts in the home MFP's job history the current logged in user's job history with the application "scan".

Then at step S7036 CPU 101 determines whether there is any job history extracted at step S7035 and associated with generating a file, that employs the PDF format, and if so then CPU 101 goes to step S7037, otherwise to step S7041.

At step S7037 CPU 101 determines whether there is any job history extracted at step S7035 and associated with generating file, that is scanned with low resolution. Low resolution as referred to herein indicates a lower resolution for example if MFP 100A can scan with two different resolutions of 600 dpi and 200 dpi, for example as indicated in Table 1. If CPU 101 determines that such history exists CPU 101 goes to step S7038 to provide a setting (e.g., set a flag) indicating that a condition 2 is established, and then goes to step S7041. Otherwise CPU 101 goes to step S7041.

Figure 11:
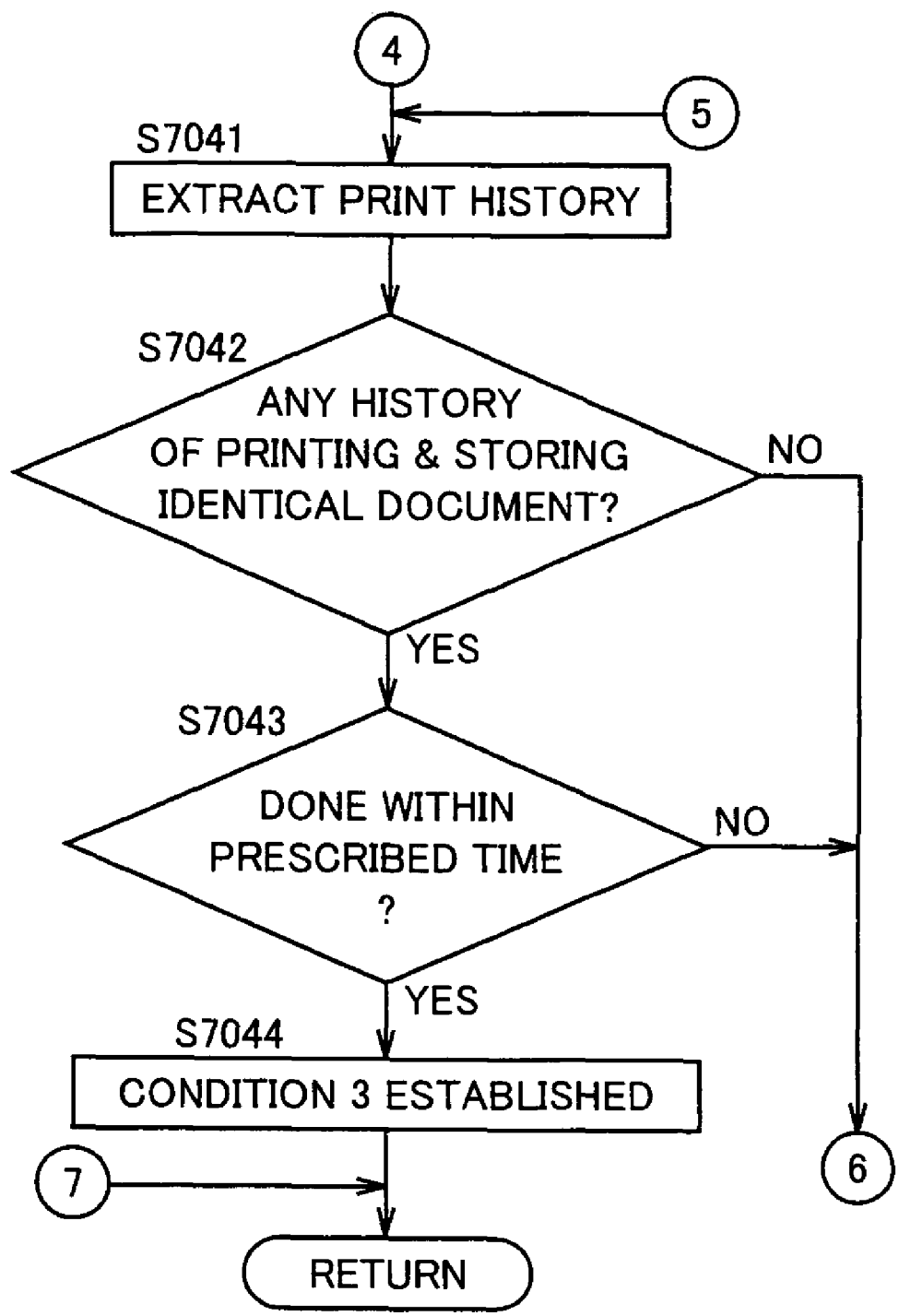

With reference to FIG. 11, at step S7041 CPU 101 extracts in the home MFP's job history the current logged in user's job history with the application "print".

Then CPU 101 goes to step S7042 to determine for a single document (or an identically name document) whether there exists a history indicating that the document has been printed and a history indicating that the document has been box-stored. If so CPU 101 goes to step S7043, otherwise to step S7039.

At step S7043 CPU 101 determines whether the single document has been printed and box-stored, as determined at step S7042, within a prescribed period of time. If so CPU 101 goes to step S7044 to provide a setting (e.g., set a flag) indicating that a condition 3 is established, and then returns the process. Otherwise, CPU 101 goes to step S7039.

At step S7039 CPU 101 causes program key analyzer 133 to search content registered with the home MFP's program key register 121, and at step S7040 determines in the logged in user's program information whether at least one operation utilizing the PDF format is registered, and if so CPU 101 goes to step S7038, otherwise returns the process.

With reference again to FIG. 8, after CPU 101 analyzes the home MFP's job history at step S703, CPU 101 goes to step S705 to determine in the job history whether condition 1 is established. If so CPU 101 goes to step S707, otherwise to step S713.

Figure 12:
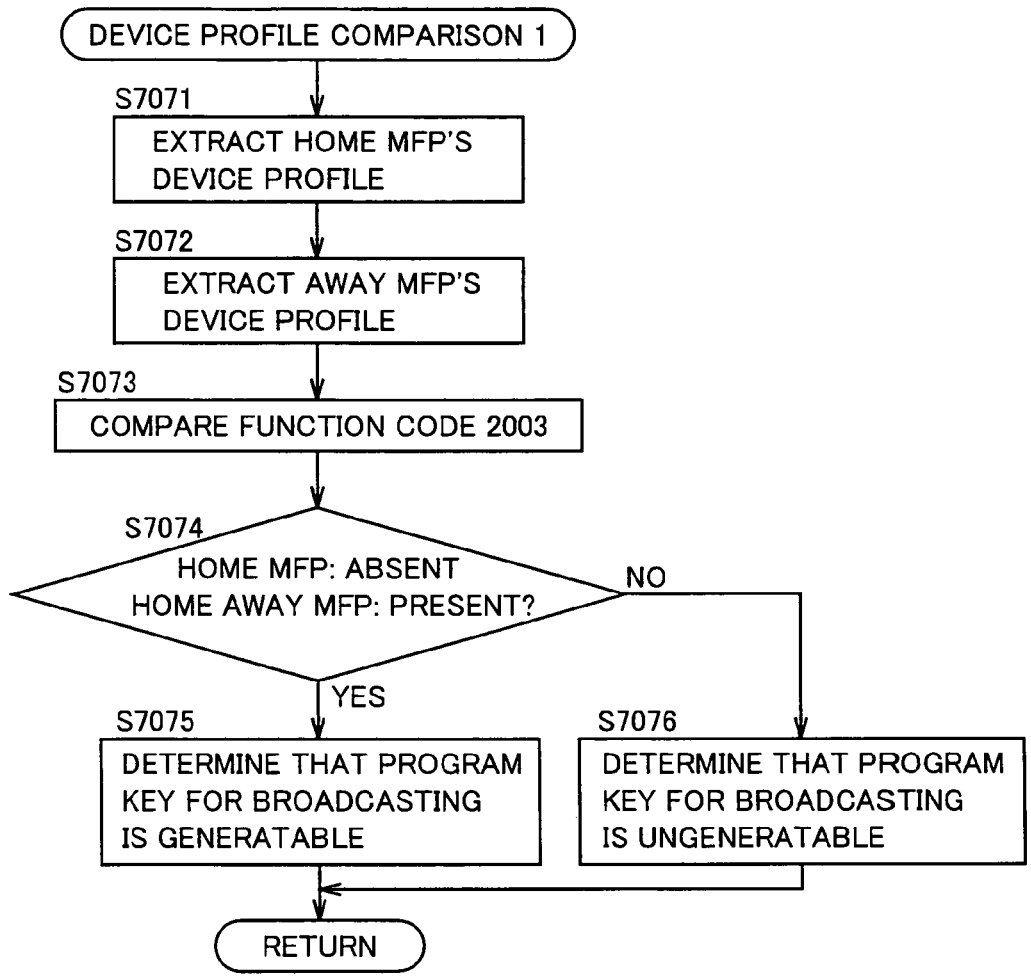
FIGS. 12, 13 and 14 are flow charts of subroutines of device profile comparison 1, 2 and 3 processes, respectively, indicated in FIG. 8.

At step S707 CPU 101 effects a process of device profile comparison 1. Note that CPU 101 drives function comparator 131 as appropriate to effect the device profile comparison 1 process, as will now be described hereinafter with reference to FIG. 12 indicating a subroutine.

With reference to the figure, the device profile comparison 1 process is performed as follows: CPU 101 initially goes to step S7071 to extract the home MFP (MFP 100A)'s device profile.

Then CPU 101 goes to step S7072 to extract an away MFP (or its MFP: MFP 100B)'s device profile.

Then CPU 101 goes to step S7073 to compare whether function code "2003" ("broadcasting", see Tables 2 and 3)'s function is mounted or not.

Then at step S7074 CPU 101 determines from a result of the comparison made at step S7073 whether a function specified by function code "2003" is not mounted in the home MFP but the away MFP. If so then CPU 101 goes to step S7075. In contrast, if such function is mounted in: neither one of the MFPs; both of the MFPs, or the home MFP but not in the away MFP, then CPU 101 goes to step S7076.

At step S7075 CPU 101 makes a decision that a program key for broadcasting is generatable, and returns the process. Making a decision can for example be setting a corresponding flag or the like.

At step S7076 CPU 101 makes a decision that a program key for broadcasting is ungeneratable, and returns the process.

With reference again to FIG. 8, after the device process file comparison 1 process is performed at step S707, CPU 101 goes to step S7079 to determine whether a program key is generatable in the device profile comparison 1 process, and if so CPU 101 goes to step S711, otherwise to step S713.

At step S711 CPU 101 drives program key generator 134, as appropriate, to generate a program key of condition 1 (a program key for broadcasting) and registers it with its MFP's program key register 121, and goes to step S713.

At step S713 CPU 101 determines as a result of analyzing the job history whether in the job history condition 2 is established. If so CPU 101 goes to step S715, otherwise to step S721.

At step S715 CPU 101 effects a process of device profile comparison 2. Note that CPU 101 drives function comparator 131, as appropriate, to effect the device profile comparison 2 process, as will now be described hereinafter with reference to FIG. 13 showing a subroutine.

Figure 13:
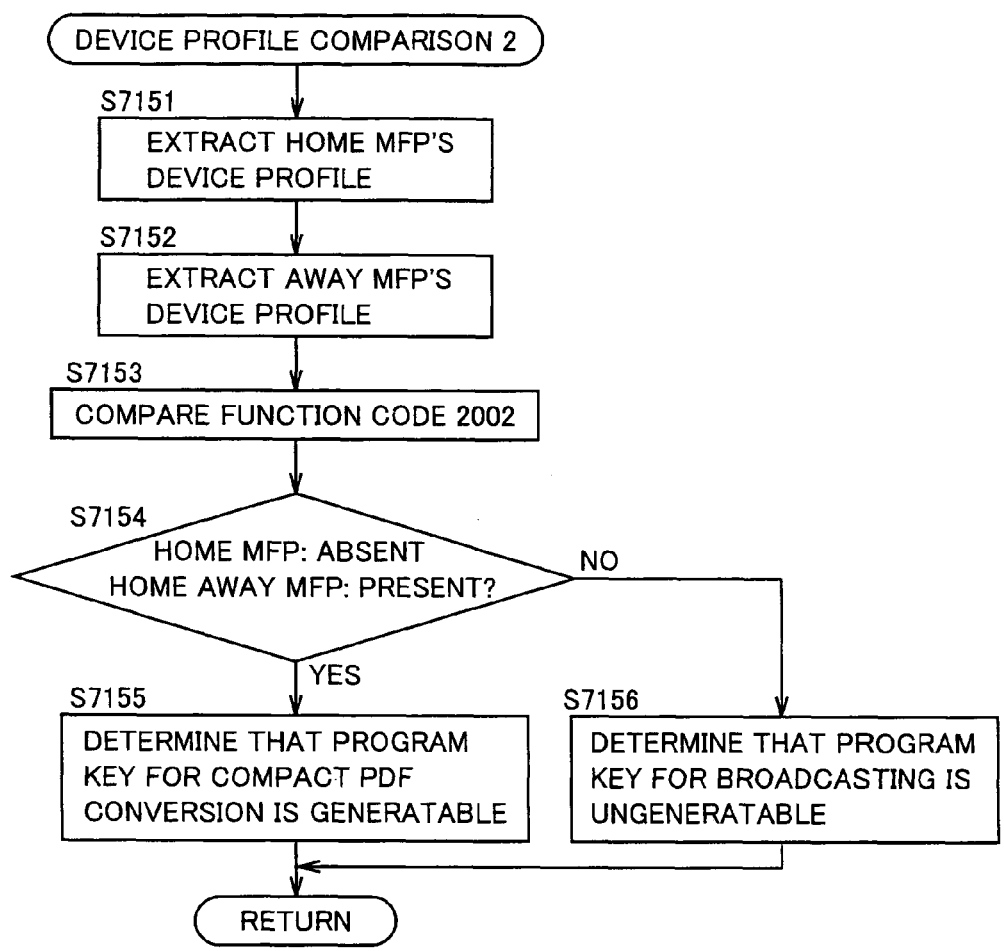

With reference to FIG. 13, the device profile comparison 2 process is effected as follows: CPU 101 initially goes to step S7151 to extract the home MFP (MFP 100A)'s device profile.

Then CPU 101 goes to step S7152 to extract an away MFP (or its MFP: MFP 100B)'s device profile.

Then CPU 101 goes to step S7153 to compare whether function code "2002" ("compact PDF conversion", see Tables 2 and 3)'s function is mounted or not.

Then at step S7154 CPU 101 determines from a result of the comparison made at step S7153 whether a function specified by function code "2002" is not mounted in the home MFP but the away MFP. If so then CPU 101 goes to step S7155. In contrast, if such function is mounted in: neither one of the MFPs; both of the MFPs; or the home MFP but not in the away MFP, then CPU 101 goes to step S7156.

At step S7155 CPU 101 makes a decision that a program key for compact PDF conversion is generatable, and returns the process.

At step S7076 CPU 101 makes a decision that a program key for compact PDF conversion is ungeneratable, and returns the process.

With reference again to FIG. 8, after the device process file comparison 2 process is performed at step S715, CPU 101 goes to step S717 to determine whether a program key is generatable in the device profile comparison 2 process, and if so CPU 101 goes to step S719, otherwise to step S721.

At step S719 CPU 101 drives program key generator 134, as appropriate, to generate a program key of condition 2 (a program key for compact PDF conversion) and registers it with its MFP's program key register 121, and goes to step S733.

With reference to FIG. 9, at step S721 CPU 101 determines as a result of analyzing the job history whether in the job history condition 3 is established. If so CPU 101 goes to step S723, otherwise to step S731.

Figure 14:
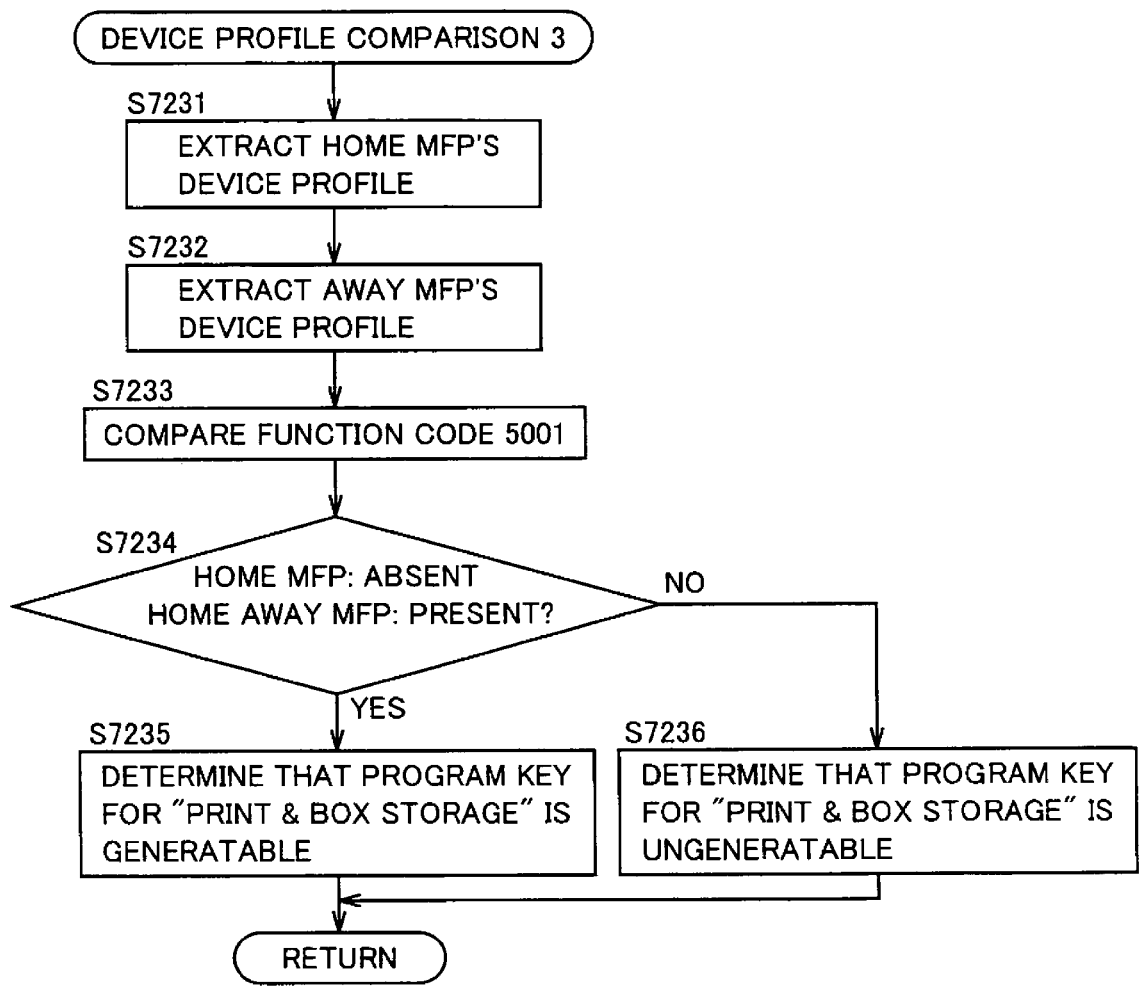

At step S723 CPU 101 effects a process of device profile comparison 3. Note that CPU 101 drives function comparator 131, as appropriate, to effect the device profile comparison 3 process, as will now be described hereinafter with reference to FIG. 14 showing a subroutine.

With reference to the figure, the device profile comparison 3 process is effected as follows: CPU 101 initially goes to step S7231 to extract the home MFP (MFP 100A)'s device profile.

Then CPU 101 goes to step S7232 to extract an away MFP (or its MFP: MFP 100B)'s device profile.

Then CPU 101 goes to step S7233 to compare whether function code "5001" ("print & box storage", see Tables 2 and 3)'s function is mounted or not.

Then at step S7234 CPU 101 determines from a result of the comparison made at step S7233 whether a function specified by function code "5001" is not mounted in the home MFP but the away MFP. If so then CPU 101 goes to step S7235. In contrast, if such function is mounted in: neither one of the MFPs; both of the MFPs; or the home MFP but not in the away MFP, then CPU 101 goes to step S7236.

At step S7235 CPU 101 makes a decision that a program key for print & box storage is generatable, and returns the process.

At step S7236 CPU 101 makes a decision that a program key for print & box storage is ungeneratable, and returns the process.

With reference again to FIG. 8, after the device process file comparison 3 process is performed at step S723, CPU 101 goes to step S725 to determine whether a program key is generatable in the device profile comparison 3 process, and if so CPU 101 goes to step S727, otherwise to step S730.

At step S727 CPU 101 drives program key generator 134, as appropriate, to generate a program key of condition 3 (a program key for print & box storage) and registers it with its MFP's program key register 121, and goes to step S729.

At step S729 PC 200 determines whether PC 200 has accessed via (the MFP's) driver and if so CPU 101 goes to step S733.

This is done in order to allow the program key generated and registered at step S727 to be displayed on a print driver screen used in printing from PC 200, since the key is a program key convenient for the user in printing from PC 200.

When PC 200 has a print driver screen opened and a signal is accordingly transmitted to an away MFP, the data of the program key can be transmitted from the away MFP and thus the program key displayed on a driver screen on PC 200 when there is an access from a print driver.

Such bidirectional communication function is itself a well-known technique and will not specifically be described.

At step S730 CPU 101 determines whether there has been any program key generated and registered since the program generation process was currently performed. If so CPU 101 goes to step S733, otherwise to step S731.

Figure 15:
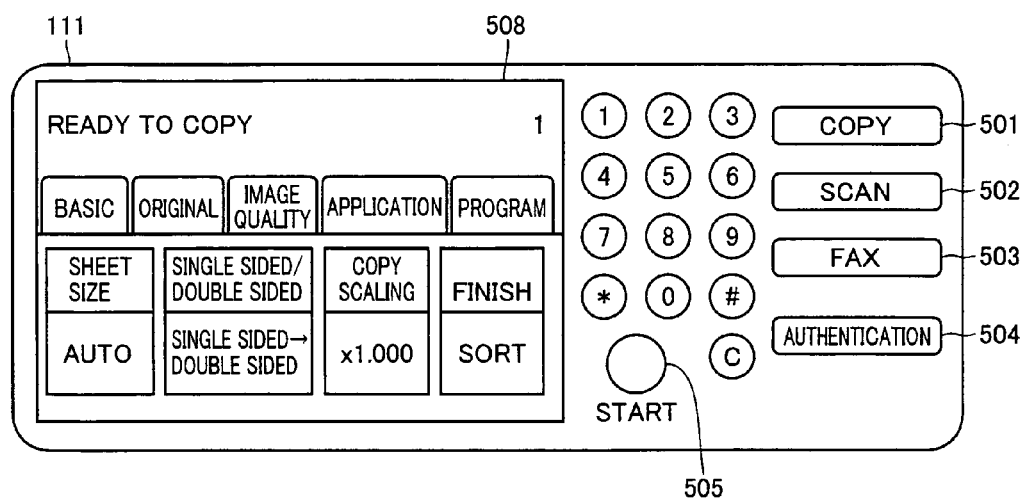

At step S731 CPU 101 causes console 111 to display a normal screen, as shown in FIG. 15, and returns the process.

With reference to FIG. 15, the console 111 display panel 508 displays a basic screen in the MFP. More specifically, the MFP is set to have a state basically capable of copy operation, and the basic screen is a screen displaying a setting associated with copying (e.g., a sheet size, a setting of a side (single-sided/double-sided) of an original and a sheet to be output involved in copying, scaling for copying, sorting, and the like).

Figure 16:
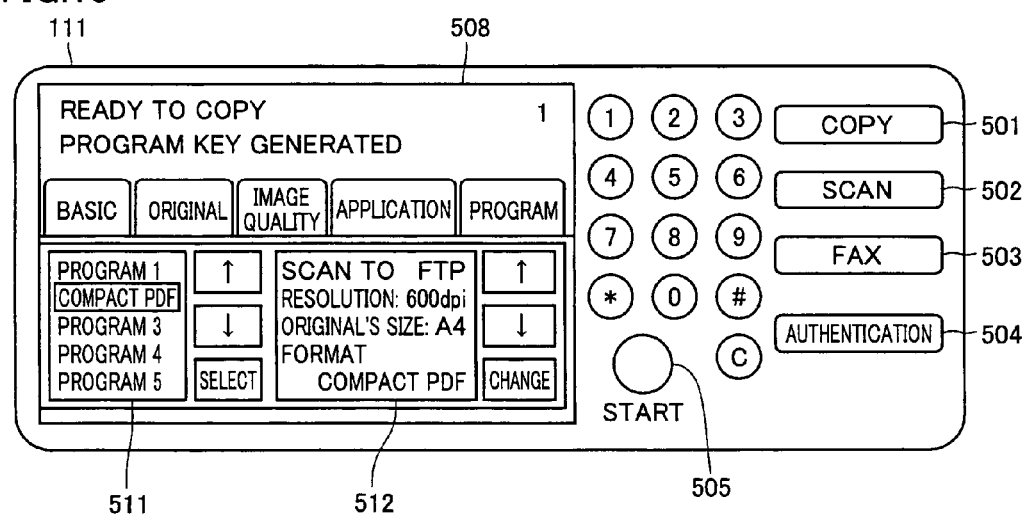

With reference to FIG. 8, at step S733 the program keys generated at steps S711, S719, S727 are displayed on the console 111 display panel 508, as shown in FIG. 16, and the process returns.

With reference to FIG. 16, the console 111 display panel 508 displays a program key display portion 511 displaying a program key, and a setting display portion 512 specifically displaying a setting corresponding to program key display portion 511. Note that program key indication box 511 indicates a plurality of program keys such as "program 1", "compact PDF", "program 3", with one of the keys displayed such that it is selected (or surrounded by a frame). Setting display portion 512 specifically displays a setting corresponding to the selected program key (i.e., a single key).

FIG. 16 indicates as one example a program key named "compact PDF" generated at step S719 and based on that condition 2 has been established. A specific setting based on this program key can by way of example include that associated with a function of "scan to file transfer protocol (FTP)", as indicated in FIG. 16 at setting display portion 512. In FIG. 16, for scan to FTP, a specific setting is provided such that in scanning, a resolution of 600 dpi is employed, an original having a size of A4 is used, and FTP transmission is performed in a compression format implemented by compact PDF. As the compression format in FTP transmission is set as "compact PDF", a program key named "compact PDF" as described above is a program key utilizing a function of compact PDF conversion. Note that such a specific setting reflects that at the home MFP and is also customized in conformity to the away MFP's performance. As an example of such customization, if at the home MFP a scanning resolution of 200 dpi is set, and at the away MFP a resolution of 600 dpi can be employed to scan, then, as shown in FIG. 16, that resolution (600 dpi) is set.

Condition 2 is established when a logged in user has utilized the PDF format in the home MFP and the home MFP does not have the compact PDF conversion function and the away MFP does, and if so, and the logged in user utilizes the away MFP, a program key utilizing the function of compact of PDF conversion is automatically generated and displayed at the away MFP.

This program key can be used by a user to allow a file generated by scanning at an MFP with a relatively high resolution to be FTP-transmitted by compact PDF allowing a file size smaller than typical PDF.

Thus, by generating this program key, a function allowing a user logging in an away MFP to more conveniently utilize a function that is not mounted in a home MFP but in the away MFP and has been utilized by the user, can positively be presented to the user.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus configured to connect to another image processing apparatus via a network, comprising:
    a display portion displaying information;
    a user authentication portion authenticating a user;
    a history information acquisition portion acquiring a history of a job executed at said other image processing apparatus by the user authenticated by said user authentication portion;
    a specifying portion specifying a function based on the history acquired by said history information acquisition portion;
    a determination portion determining if the specified function is not mounted in said other image processing apparatus and is mounted in the image processing apparatus;
    a key generator generating a key for setting the specified function when said determination portion determines that the specified function is not mounted in said other image processing apparatus and is mounted in the image processing apparatus; and
    a display control portion configured to cause said display portion to display the key generated by said key generator.

2. The image processing apparatus according to claim 1, wherein:
    said specifying portion specifies compact PDF conversion compressing an image file in a form corresponding to a type of an image included in said image file for a benefit of more compact file size as the function when said acquired history includes the history of compressing a file;
    said key generator generates the key for setting the compact PDF conversion if said determination portion determines that the compact PDF conversion is not mounted in said other image processing apparatus and is mounted in the image processing apparatus; and
    said display control portion causing said display portion to display the key for the compact PDF conversion.

3. The image processing apparatus according to claim 1, wherein said other image processing apparatus is a home multi-function peripheral that is utilized frequently by a the user authenticated by said user authentication portion.

4. An image processing apparatus according to claim 1, further, comprising,
    a function information acquisition portion acquiring information of a function mounted in said other image processing apparatus,
    wherein said determination portion determines whether the specified function is not mounted in said other image processing apparatus or not based on the information acquired by said function information acquisition portion.

5. The image processing apparatus according to claim 1, wherein said specifying portion specifies, when the acquired history satisfies a prescribed condition, the function enabling an execution of a process corresponding to said prescribed condition.

6. The image processing apparatus according to claim 5, wherein:
    said specifying portion specifies broadcasting as the function, when said history information acquisition portion acquires a history of transmitting a single document to different destinations within a prescribed period of time;
    said key generator generates the key for setting the broadcasting if said determination portion determines that the broadcasting is not mounted in said other image processing apparatus and is mounted in the image processing apparatus; and
    said display control portion causes said display portion to display the key for the broadcasting.

7. The image processing apparatus according to claim 5, wherein:
    said specifying portion specifies compact PDF conversion compressing an image file in a form corresponding to a type of an image included in said image file for a benefit of more compact file size as the function when said history information acquisition portion acquires a history of utilizing a function compressing a file;
    said key generator generates the key for setting the compact PDF conversion if said determination portion determines that the compact PDF conversion is not mounted in said other image processing apparatus and is mounted in the image processing apparatus; and said display control portion causes said display portion to display the key for the compact PDF conversion.

8. The image processing apparatus according to claim 4, wherein the image processing apparatus connected to said other image processing apparatus is a home multi-function peripheral that is utilized on said network frequently by a user authenticated by said user authentication portion.

9. The image processing apparatus according to claim 2, wherein:
said specifying portion specifies the compact PDF conversion when said acquired history includes the history of the function compressing a file scanned with low resolution.

10. The image processing apparatus according to claim 1, wherein:
said specifying portion specifies, if the acquired history indicates that plural prescribed processes are executed within a prescribed period of time, the function enabling the execution of the plural prescribed processes at one time.

11. The image processing apparatus according to claim 10, wherein:
said specifying portion specifies broadcasting as the function when said acquired history includes the history of transmitting a single document to different destinations within the prescribed period of time;
said key generator generates the key for setting the broadcasting if said determination portion determines that the broadcasting is not mounted in said other image processing apparatus and is mounted in the image processing apparatus; and
said display control portion causes said display portion to display the key for the broadcasting.

12. The image processing apparatus according to claim 10, wherein:
said specifying portion specifies "print & box storage" printing and box-storing a single document at one time when said acquired history includes the history indicating that a single document is printed and box-stored within the prescribed period of time;
said key generator generates the key for setting the "print & box storage" if said determination portion determines that the "print & box storage" is not mounted in said other image processing apparatus and is mounted in the image processing apparatus; and
said display control portion causes said display portion to display the key for the "print & box storage".

13. A method of controlling an image processing apparatus configured to connect to another image processing apparatus via a network, comprising the steps of:
authenticating a user;
acquiring a history of a job executed at said other image processing apparatus by the user authenticated at said authentication step;
specifying a function based on the history acquired at said acquiring step;
determining that if the specified function is not mounted in said other image processing apparatus and is mounted in the image processing apparatus;
generating a key for setting the specified function when said determining step determines that the specified function is not mounted in said other image processing apparatus and is mounted in the image processing apparatus; and
displaying the key generated at said generating step.

14. The method according to claim 13, wherein said other image processing apparatus is a home multi-function peripheral that is utilized frequently by the user authenticated.

15. The method according to claim 13, wherein said step of specifying specifies compact PDF conversion compressing an image file in a form corresponding to a type of an image included in said image file for a benefit of more compact file size when said acquired history includes the history of compressing a file;
said step of generating generates the key for setting the compact PDF conversion if said step of determining determines that the compact PDF conversion is not mounted in said other image processing apparatus and is mounted in the image processing apparatus; and
said step of displaying displays the key for the compact PDF conversion.

16. The method according to claim 15, wherein said step of specifying specifies the compact PDF conversion when said acquired history includes the history of the function compressing a file scanned with low resolution;
said step of generating generates the key for setting the compact PDF conversion if said step of determining determines that the compact PDF conversion is not mounted in said other image processing apparatus and is mounted in the image processing apparatus; and
said step of displaying displays the key for the compact PDF conversion.

17. The method according to claim 13, wherein said step of specifying specifies, if the acquired history indicates that plural prescribed processes are executed within a prescribed period of time, the function enabling the execution of the plural prescribed process at one time.

18. The method according to claim 17, wherein said step of specifying specifies broadcasting as the function when said acquired history includes the history of transmitting a single document to different destinations within the prescribed period of time;
said step of generating generates the key for setting the broadcasting if said step of determining determines that the broadcasting is not mounted in said other image processing apparatus and is mounted in the image and said step of displaying displays the key for the broadcasting.

19. The method according to claim 17, wherein said step of specifying specifies "print & box storage" printing and box-storing a single document at a time when said acquired history includes the history indicating that a single document is printed and box-stored within a prescribed period of time;
said step of generating generates the key for setting the "print & box storage" if said determination portion determines that the "print & box storage" is not mounted in said other image processing apparatus and is mounted in the image processing apparatus; and
said step of displaying displays the key for the "print & box storage".

* * * * *